United States Patent Office 3,514,776
Patented May 26, 1970

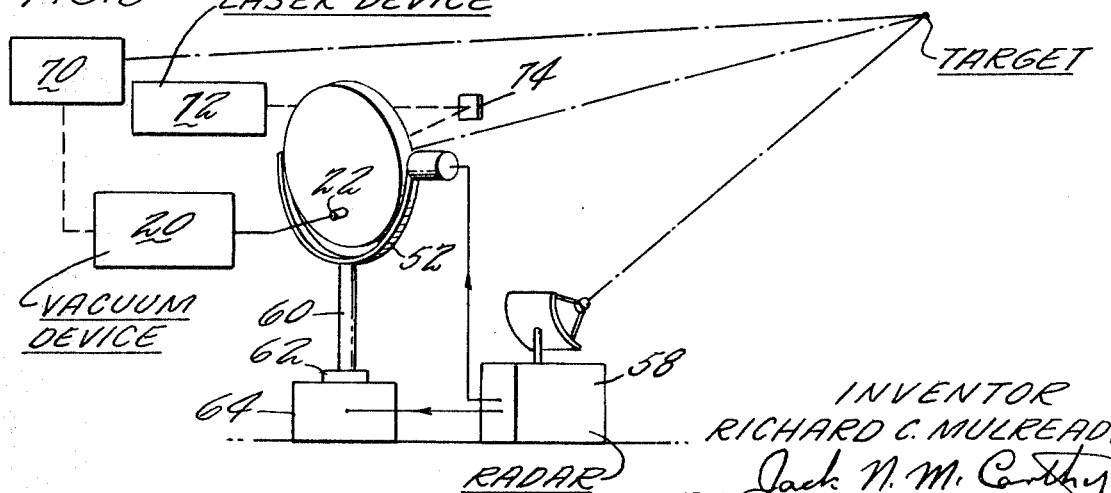

3,514,776
MIRROR DEVICE
Richard C. Mulready, Jupiter, Fla., assignor to United Aircraft Corporation, East Hartford, Conn., a corporation of Delaware
Filed May 27, 1968, Ser. No. 733,221
Int. Cl. G01s 9/00; G02b 5/10
U.S. Cl. 343—6                                14 Claims

ABSTRACT OF THE DISCLOSURE

A system for aiming a laser beam and focusing it on a target includes a concave mirror having an adjustable reflecting concave face which is capable of being aimed at a target by elevation and azimuth signals from a radar unit with another sensor providing a signal to focus the adjustable reflecting surface on the target. A laser device directs a laser beam into said mirror for focusing, said mirror being formed by having a plate mounted in a housing which can have its position adjusted by forces acting between the surface and housing.

BACKGROUND OF THE INVENTION

This invention relates to a laser beam reflecting device for tracking a target and focusing the beam.

SUMMARY OF THE INVENTION

In the system disclosed, a mirror has been provided which can be made without requiring the usual grinding and polishing to generate a curved shape. A feature of the invention is to provide an adjustable mirror wherein the curvature of the reflecting surface can be changed during operation to obtain a desired setting for focus.

A system has been provided which will aim a mirror at a target and then focus the beam.

BRIEF DESCRIPTION OF THE DRAWINGS

FIG. 1 is a schematic showing of a constant thickness plate having a vacuum placed on its lower side.

FIG. 2 is a schematic showing of a plate having a predetermined varied thickness having a vacuum placed on its lower side.

FIG. 3 is a cross-sectional view of one modification of a mirror formed from a plate of varying contour.

FIG. 4 is a cross-sectional view of another modification of a mirror formed from a plate of varying contour.

FIG. 5 is an enlarged view showing one end of a plate of varying contour.

FIG. 6 is a front view of a system incorporating the invention.

FIG. 7 is a side view of FIG. 6.

FIG. 8 is a perspective view of FIGS. 6 and 7 showing the target and optical system for providing a laser beam.

DESCRIPTION OF THE PREFERRED EMBODIMENT

Referring to FIG. 1, a plate 2 of constant thickness throughout is shown supported by a peripheral member 4 defining an airtight cavity 6. When the pressure in the cavity 6 has been reduced, the plate 2 assumes the curve represented by 8. The shape of this curve is not parabolic.

Referring to FIG. 2, a plate 2a of variable thickness formed by machining one side, by grinding, chemical etching or other known means, is shown supported with the altered side down by a peripheral member 4a defining an airtight cavity 6a. When the pressure in the cavity 6a has been reduced, the plate 2a assumes the curve represented by 8a. The shape of this curve is determined by the manner in which the plate 2a has been altered from a constant thickness and can be made parabolic.

In the formation of a mirror, one side of the flat plate 2 is polished as a mirror, while the opposite side is contoured providing a plate of desired varying thickness as in FIG. 5. This contouring of a plate 2b can be made so that when the pressure in the cavity changes, the polished side of the plate is formed concavely or convexly in a predetermined curve. For example, this formation of plate 2b can be made so that when a reduction in pressure occurs in the airtight cavity, the plate is made into a parabolic reflecting mirror.

Two methods are shown of constructing a reflecting concave or convex mirror from a polished flat plate. While FIGS. 3 and 4 show plates which have been contoured to form a parabola, other plates having different shapes may be used. FIG. 3 shows a housing 10 having a cylindrical section 12 extending from a flat back plate 14. A ring member 16, having an inner flange and an outer flange, is fixed by its inner flange to the cylindrical section 12. A retaining ring 18 is fixed to said outer flange and has a flange 21 extending inwardly and has its inner end connected to a short cylindrical section 23 which is of the same size and aligned with section 12. An annular space separates the sections 12 and 23. These rings 16 and 18 provide for maintaining the plate 2a in a position adjacent the opening of the housing 10 when a force is not holding the plate in a reflecting contour with the plate 2a held against the free end periphery of one of the cylindrical sections. It is noted that sealing means 19 are provided around the free end of the cylindrical section 12 and 23 to aid in starting and holding a vacuum or pressure in the cavity 6a. A vacuum, and/or pumping device 20 is fixed to a conduit section 22 which extends through the back plate 14 for evacuating or pressurizing the cavity behind said plate 2 to a pressure $P_s$ as desired.

If a fixed position mirror is being formed, the device 20 produces a desired pressure $P_s$ to place the polished flat plate at a desired reflecting concave or convex contour and the conduit section 22 is permanently closed, as by a plug. However, if it is desired to have a mirror which can have a reflecting surface which can be varied, a control is applied to device 20 to have it increase or decrease the value of $P_s$ to any desired value.

FIG. 3 shows a housing 30 having a cylindrical section 32 extending from a flat back plate 34. Means for retaining the plate 2a are used which are identical to thoee in FIG. 3. The precontoured side of the plate 2a contains a plurality of bosses, each having a bolt 38 pivotally mounted thereto. From a position where the plate 2a is held by its retaining means, each of the bolts 38 extends rearwardly through openings 40 in the back plate of the housing 34. Nuts 42 cooperate with the ends of the bolts extending to the exterior of the housing 34. To arrive at a desired reflecting concave or convex mirror, the nuts 42 are each rotated individually to provide desired forces pulling or pushing on the contoured side. If the nuts are to push the bolts they will have to be axially retained on the housing. While nuts have been shown, other means to axially move said bolts can be used. It is noted that the pivotal axis of the bolts 38 on each boss 36 is placed normal to a radial line drawn through the center of its cooperating boss. A desired contour can be formed by actually measuring the convex or concave reflecting surface or knowing the amount each of the respective bolts 38 is to extend out of the back plate 34.

FIGS. 6, 7 and 8 show a reflecting mirror 50 having a concave surface for use in transmitting a laser beam. A mirror 50 is mounted for movement about a horizontal axis in yoke 52. Trunnion 54 extends from each side of the mirror and each trunnion is pivoted in one curved arm of the yoke 52. A motor 56 fixed to one of said curved arms is connected to a trunnion so as to actuate the mirror about the horizontal axis. Motor 56 is fed an elevation signal from radar unit 58. The yoke 52 is mounted on the free end of a shaft 60 which is rotatably mounted in the base 62. A motor 64 fixed to the bottom of base 62 is connected to the bottom of shaft 60. Motor 64 is fed an azimuth signal from radar unit 58. The radar unit 58 is of the kind having means for aiming said reflecting mirror so that it will be properly set in elevation and azimuth.

Sensor 70 receives a signal from a target in the direction of the reflecting mirror and in turn controls the vacuum device 20 so as to control the amount of contour of the reflecting mirror to provide a focusing effect of a laser beam on the target.

A laser device 72 directs a laser beam into an optical device 74 which is in turn directed into the mirror 50.

It is to be understood that the invention is not limited to the specific description above or specific figures shown, but may be used in other ways without departure from its spirit as defined by the following claims.

I claim:

1. A method of forming a varying thickness reflecting mirror comprising the steps of (1) selecting a plate of the proper size having one flat side, (2) polishing said flat side to a required mirror finish, (3) contouring the other side of said plate to a predetermined contour different from said one flat side to arrive at a desired curve of the one flat side when the plate is deformed by forces acting on the contoured side.

2. A method as set forth in claim 1 wherein step 3 the forces acting are formed by a suction over the entire contoured side.

3. A method as set forth in claim 1 wherein step 3 the forces acting are formed by a plurality of individual forces spaced about the contoured side.

4. A method as set forth in claim 1 wherein step 3 the forces acting are formed by a pressure over the entire contoured side.

5. A mirror device having a plate of varying thickness, said plate having one side polished to a required mirror finish, said plate having its other side contoured to a predetermined contour different from said one side to arrive at a desired curve of the one polished side when the plate is deformed, means for holding said plate with its one polished side outwardly to provide a reflecting surface, said last named means including a housing means on said other contoured side, said housing having means for deforming said plate to an operating position.

6. A combination as set forth in claim 5 wherein control means are provided to vary the means for deforming said plate to provide a mirror having a plate in which its reflecting surface can be changed during use.

7. A combination as set forth in claim 5 wherein said means for holding said plate has a peripheral member enclosing the edge of the plate.

8. A combination as set forth in claim 5 wherein said housing means includes a cavity behind said one contoured side, said means for deforming includes means for forming a vacuum in said cavity.

9. A combination as set forth in claim 8 wherein said means for holding said plate has a peripheral member enclosing the edge of the plate.

10. A combination as set forth in claim 8 wherein control means are provided to vary the vacuum provided by said means for forming a vacuum to provide a mirror having a plate in which its reflecting surface can be changed during use.

11. A mirror device having a plate of varying thickness, said plate having one side polished to a required finish, said plate having its other side contoured to a predetermined contour to arrive at a desired curve of the one flat side when the plate is deformed, means for holding said plate with its one polished side outwardly to provide a reflecting surface, said last named means including a housing means behind said one contoured side, said housing means having means for deforming said plate to an operating position, said means for retaining including a plurality of bolt means extending from the contoured side of said plate to said housing means.

12. A laser beam directing and focusing system having means for generating a laser beam, a laser beam reflecting mirror device, mounting means for said mirror device to provide for movement thereof in elevation and azimuth, a means for providing elevation and azimuth control to aim said reflecting mirror device at a desired object, and means for focusing said reflecting mirror device such that the laser beam converges on said object.

13. A combination as set forth in claim 12 wherein said means for mounting said mirror device includes a yoke, trunnion means located between said yoke and a said mirror device at diametrically opposed positions to provide for movement of said mirror device, said means for mounting said mirror device includes a shaft extending from said yoke to provide for pivotal movement of said yoke and mirror device, a first motor means to rotate said mirror device about said trunnion, a second motor means for rotating said mirror device and said yoke about said shaft, said means for providing elevation and azimuth control being connected to said first and second motor means.

14. A combination as set forth in claim 13 wherein said means for focusing said reflecting mirror device includes a means for receiving a directional signal from an object, said mirror device having a variable reflecting surface for focusing, means for varying said reflecting surface, said means for focusing said reflecting mirror device includes means for sending a signal to said means for varying said reflecting surface.

References Cited

UNITED STATES PATENTS

| | | | |
|---|---|---|---|
| 2,547,945 | 4/1951 | Jenks | 343—6 |
| 2,952,189 | 9/1960 | Pajes | 350—295 |
| 3,229,578 | 1/1966 | Smith | 350—295 |
| 3,254,342 | 5/1966 | Miller | 350—295 |
| 3,300,777 | 1/1967 | Tarr | 343—6 |

OTHER REFERENCES

"Process for Obtaining a Convex Surface," by R K. Brunner, IBM Technical Disclosure Bulletin, vol. 1, No. 1, June 1958, p. 22.

RODNEY D. BENNETT, JR. Primary Examiner

M. F. HUBLER, Assistant Examiner

U.S. Cl. X.R.

350—293, 295